US010391974B2

(12) United States Patent
Rosas Landa Reyes et al.

(10) Patent No.: US 10,391,974 B2
(45) Date of Patent: Aug. 27, 2019

(54) ANTITHEFT SECURITY SYSTEM AND METHOD FOR A MOTOR VEHICLE

(71) Applicant: FORD GLOBAL TECHNOLOGIES, LLC, Dearborn, MI (US)

(72) Inventors: Rafael Rosas Landa Reyes, Cuautitlan Izcalli (MX); Alan Rodrigo Saucedo Osorno, Iztapalapa (MX); Ricardo David Luna Olvera, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 336 days.

(21) Appl. No.: 15/201,993

(22) Filed: Jul. 5, 2016

(65) Prior Publication Data

US 2018/0009413 A1 Jan. 11, 2018

(51) Int. Cl.

| | |
|---|---|
| ***B60R 25/045*** | (2013.01) |
| ***B60R 25/00*** | (2013.01) |
| ***B60R 13/10*** | (2006.01) |
| ***E05B 77/44*** | (2014.01) |
| ***E05B 81/04*** | (2014.01) |
| ***E05B 81/56*** | (2014.01) |
| ***E05B 81/66*** | (2014.01) |

(52) U.S. Cl.

CPC .......... *B60R 25/045* (2013.01); *B60R 13/105* (2013.01); *B60R 25/00* (2013.01); *E05B 77/44* (2013.01); *E05B 81/04* (2013.01); *E05B 81/56* (2013.01); *E05B 81/66* (2013.01)

(58) Field of Classification Search

CPC ....... B60R 25/045; E05B 77/44; E05B 81/04; E05B 81/56; E05B 81/66

See application file for complete search history.

(56) References Cited

U.S. PATENT DOCUMENTS

| | | | | |
|---|---|---|---|---|
| 1,629,959 | A | 5/1927 | Nelson | |
| 2,151,598 | A | 3/1939 | House | |
| 7,111,420 | B2 | 9/2006 | Glickman | |
| 7,401,427 | B2 | 7/2008 | Zander | |
| 2011/0133912 | A1* | 6/2011 | Tesman | B60R 25/045 340/426.12 |

(Continued)

FOREIGN PATENT DOCUMENTS

| | | | |
|---|---|---|---|
| CN | 2302926 | Y | 1/1999 |
| CN | 1333148 | A | 1/2002 |

(Continued)

OTHER PUBLICATIONS

English Machine Translation of CN102700477A.

(Continued)

*Primary Examiner* — Barry Gooden, Jr.

(74) *Attorney, Agent, or Firm* — Jason Rogers; Vichit Chea; King & Schickli, PLLC

(57) ABSTRACT

An antitheft security system for a motor vehicle includes a license plate locking mechanism and a control module. The license plate locking mechanism functions to secure a license plate to the motor vehicle. The control module includes a controller configured to interrupt power from a power source of the motor vehicle in response to disconnection of the license plate from the motor vehicle. A related antitheft method is also disclosed.

12 Claims, 2 Drawing Sheets

(56) References Cited

U.S. PATENT DOCUMENTS

| | | | | |
|---|---|---|---|---|
| 2011/0185605 | A1* | 8/2011 | Parenti | B60R 13/10 40/202 |
| 2012/0248283 | A1* | 10/2012 | Chen | B60R 13/105 248/551 |
| 2013/0112823 | A1* | 5/2013 | Kreft | B60R 13/105 248/205.3 |
| 2017/0057462 | A1* | 3/2017 | Lykkja | G08B 21/0205 |
| 2018/0009413 | A1* | 1/2018 | Rosas Landa Reyes | B60R 25/045 |

FOREIGN PATENT DOCUMENTS

| | | | |
|---|---|---|---|
| CN | 102700477 | A | 10/2012 |
| WO | 2007030827 | A2 | 3/2007 |

OTHER PUBLICATIONS

English Machine Translation of CN1333148A.
English Machine Translation of CN2302926Y.
Zip Products , Inc. , C6 Corvette Removable Front License Plate Mount, 05-13 Removable Front License Plate Mount, Zip Products Inc., Copyright 2016, pp. No. 1-3, Zip Products, Inc., Mechanicsville, VA 23111.

* cited by examiner

ANTITHEFT SECURITY SYSTEM AND METHOD FOR A MOTOR VEHICLE

TECHNICAL FIELD

This document relates generally to the motor vehicle equipment field and, more particularly, to an antitheft security system for a motor vehicle as well as to a related antitheft method.

BACKGROUND

Car theft is a significant concern of motor vehicle owners. In fact, many motor vehicle operators must park their motor vehicles in areas with high theft statistics. Unless one is constantly monitoring the motor vehicle, the motor vehicle may be stolen for a substantial amount of time before the theft is reported to the police, thereby reducing the likelihood of motor vehicle recovery.

This document relates to a new and improved antitheft security system and related method for a motor vehicle which provides the motor vehicle operator with greater peace of mind and significantly increases the difficulty of stealing the motor vehicle.

More specifically, the antitheft security system allows one to easily remove the license plate from the motor vehicle. As a motor vehicle operated without a license plate draws the attention of police and safety officers, this discourages motor vehicle theft. In addition, when the operator has removed the license plate, the antitheft security system automatically interrupts power from a power source of the motor vehicle so as to prevent motor vehicle operation.

SUMMARY

In accordance with the purposes and benefits described herein, an antitheft security system is provided for a motor vehicle. That antitheft security system comprises a license plate locking mechanism for releasably security a license plate to the motor vehicle. In addition, the antitheft security system comprises a control module. That control module includes a controller that is configured to interrupt power from a power source of the motor vehicle in response to disconnection of the license plate from the motor vehicle.

The license plate locking mechanism may include a bracket holding the license plate and a latch securing the bracket to the motor vehicle when the license plate is in the home position such as on the rear of the motor vehicle. In one of many possible embodiments, the latch is a push-push lock and the bracket includes a lug received and held in the push-push lock.

In such an embodiment, the control module may include a device for monitoring receipt of the lug in the push-push lock. Further, the control module may include a defeat switch between the power source and a motor of the motor vehicle whereby when the lug is removed from the push-push lock, the defeat switch is opened to interrupt power from the power source to the motor. If the motor vehicle is powered by an internal combustion engine that motor may be a starter motor for starting the internal combustion engine. If the motor vehicle is an electrical vehicle powered by an electric traction motor, that motor may be the traction motor.

In another of the many possible embodiments, the latch may include an electronic actuator and the bracket includes a lug engaged and held by the latch. In such an embodiment the control module may further include a device for monitoring engagement of the lug with the latch.

Further, the control module may include a defeat switch between the power source and a motor of the motor vehicle whereby when the lug is removed from engagement with the latch, the defeat switch is opened to interrupt power from the power source to that motor. Where the motor vehicle is powered by an internal combustion engine that motor may be the starter motor used to start the internal combustion engine. Where the motor vehicle is powered by an electric traction motor that motor may be the electric traction motor. Further, in this embodiment the control module may include an actuator to lock and unlock the latch from the lug.

In accordance with an additional aspect, a method is provided of securing a motor vehicle against theft. That method may be broadly described as comprising the step of preventing operation of the motor vehicle when a license plate has removed from a home position on the motor vehicle. Where the motor vehicle is powered by an internal combustion engine, the method may further include the step of disconnecting a starter motor of the motor vehicle from a power source of the motor vehicle when the license plate is removed from the home position. Where the motor vehicle is powered by an electric traction motor, the method may include the step of disconnecting the traction motor of the motor vehicle from a power source of the motor vehicle when the license plate is removed from the home position.

In addition, the method may include the step of holding the license plate in a bracket and locking, by a lock, the bracket to the motor vehicle when the license plate is in the home position. Further, the method may include the step of detecting, by a monitoring device, when the lock is unlocked and the license plate bracket is removed from the home position. Still further, the method may include the step of interrupting, by a control module, power from the power source when the lock is unlocked and the license plate bracket is removed from the home position.

In the following description, there are shown and described several preferred embodiments of the antitheft security system and the related method. As it should be realized, the antitheft security system and related method are capable of other, different embodiments and their several details are capable of modification in various, obvious aspects all without departing from the antitheft security system and related method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the antitheft security system and related method and together with the description serve to explain certain principles thereof. In the drawing figures.

Reference will now be made in detail to the present preferred embodiments of the antitheft security system, examples of which are illustrated in the accompanying drawing figures.

DETAILED DESCRIPTION

Figure 1:
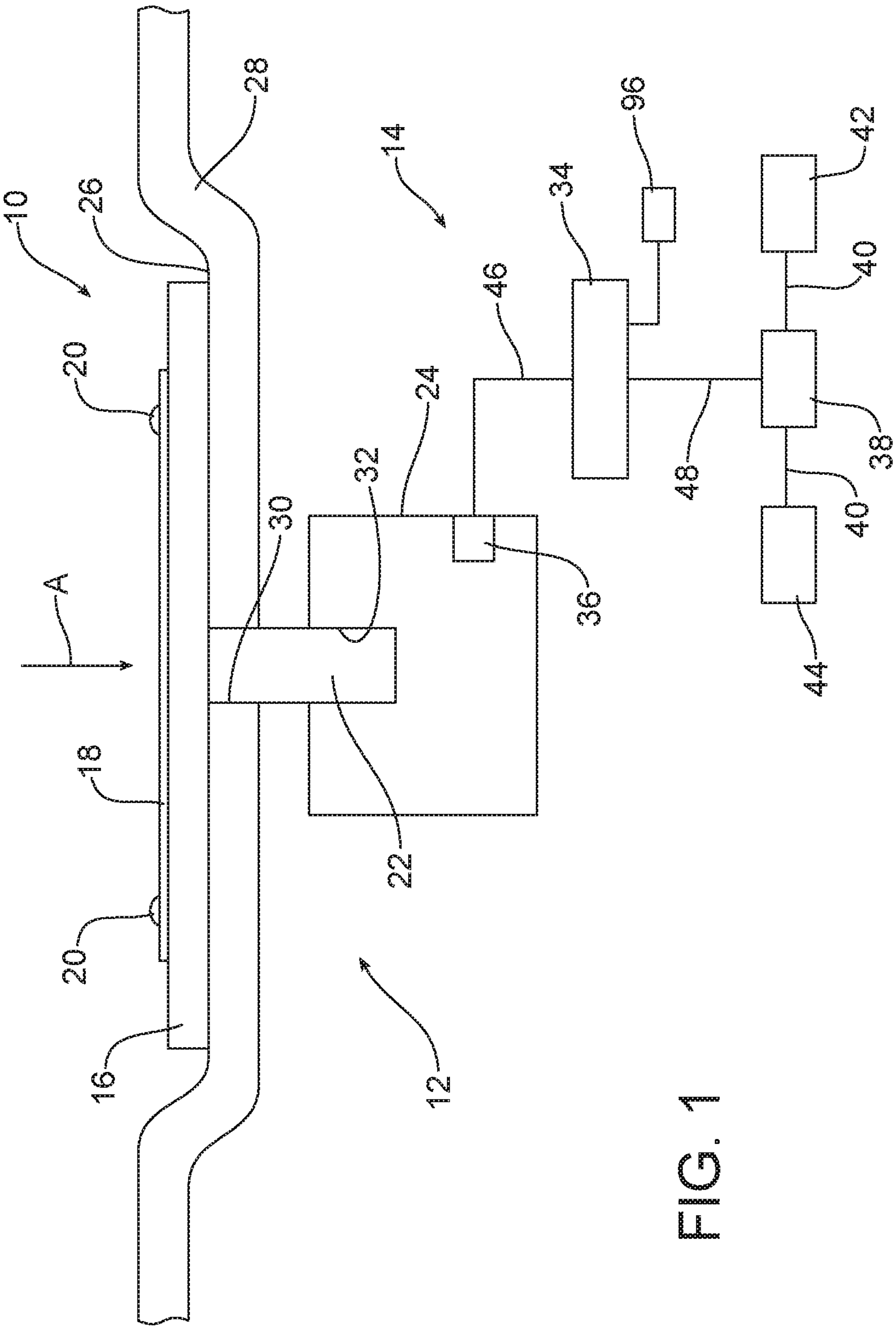
FIG. 1 is a schematic block diagram of a first embodiment of the present invention incorporating a push-push lock.

Reference is now made to FIG. 1 which schematically illustrates one embodiment of many possible embodiments of an antitheft security system 10. As illustrated in FIG. 1, the antitheft security system 10 includes a license plate locking mechanism, generally designated by reference numeral 12 and a control module, generally designated by reference numeral 14.

The illustrated control module 14 includes a license plate mounting bracket 16 to which a license plate 18 is fixed by screws 20 or other fasteners. The license plate bracket 16 includes a lug 22. As further illustrated in FIG. 1, the license plate locking mechanism 12 also includes a latch 24 in the form of a push-push lock which allows the license plate 18 to be secured to the motor vehicle in a home position illustrated as a recess 26 in a rear body panel 28 of a motor vehicle. More specifically, the lug 22 is aligned with an aperture 30 in the body panel 28 and inserted through that aperture into a receiver opening 32 in the push-push lock 24. The lug 22 is pushed into the receiver opening 32 of the push-push lock 24 in order to secure the license plate 18, carried on the license plate mounting bracket 16, in the home position/recess 26.

As further illustrated in FIG. 1, the control module 14 includes a controller 34. The controller 34 is a computing device such as a dedicated microprocessor or electronic control unit (ECU) operating in accordance with instructions from appropriate control software. Thus, the controller 34 comprises one or more processors, one or more memories and one or more network interfaces all communicating with each other over a communication bus. The controller 34 is connected to a device 36 for monitoring or sensing the connection status of the lug 22 with the latch or push-push lock 24. Further, the controller 34 is connected to a defeat switch 38 in the power line 40 leading from the power source 42 to a motor 44 of the motor vehicle. Where the motor vehicle is powered by an internal combustion engine, that motor 44 may comprise a starter motor for starting the internal combustion engine. Where the motor vehicle is powered by an electric traction motor, that motor 44 may be the electric traction motor.

Following the parking of the motor vehicle, an individual may secure the motor vehicle against theft by going to the rear of the motor vehicle and pushing in the direction of action arrow A on the license plate 18 and/or the license plate mounting bracket 16. This pushing action causes the lug 22 to be released by the latch or push-push lock 24 thereby allowing the operator to remove the license plate from the home position in the recess 26 at the rear of the motor vehicle. The license plate 18 may then be locked by the motor vehicle operator in the trunk of the motor vehicle or taken by the operator to a remote location. Advantageously, the removal of the license plate is a detriment to any attempt to steal the motor vehicle as a motor vehicle operator without a license plate 18 is sure to draw the attention of law enforcement officers even in the absence of a stolen vehicle report.

The antitheft security system 10 also automatically provides an additional security measure. More specifically, the monitoring device or sensor 36 (1) detects the disconnection of the lug 22 from the latch/push-push lock 24 and, therefore, the removal of the license plate 18 and (2) provides an appropriate data signal to the controller 34 along the data line 46. In response to this data, the controller 34 sends a control signal along the control signal line 48 to the defeat switch 38. As a result, the normally closed defeat switch 38 is opened thereby interrupting power from the power source 42 to the motor 44 of the motor vehicle. Thus, the antitheft security system 10 effectively prevents operation of the motor vehicle when the license plate 18 has been removed from the home position in the recess 26 on the motor vehicle.

Figure 2:
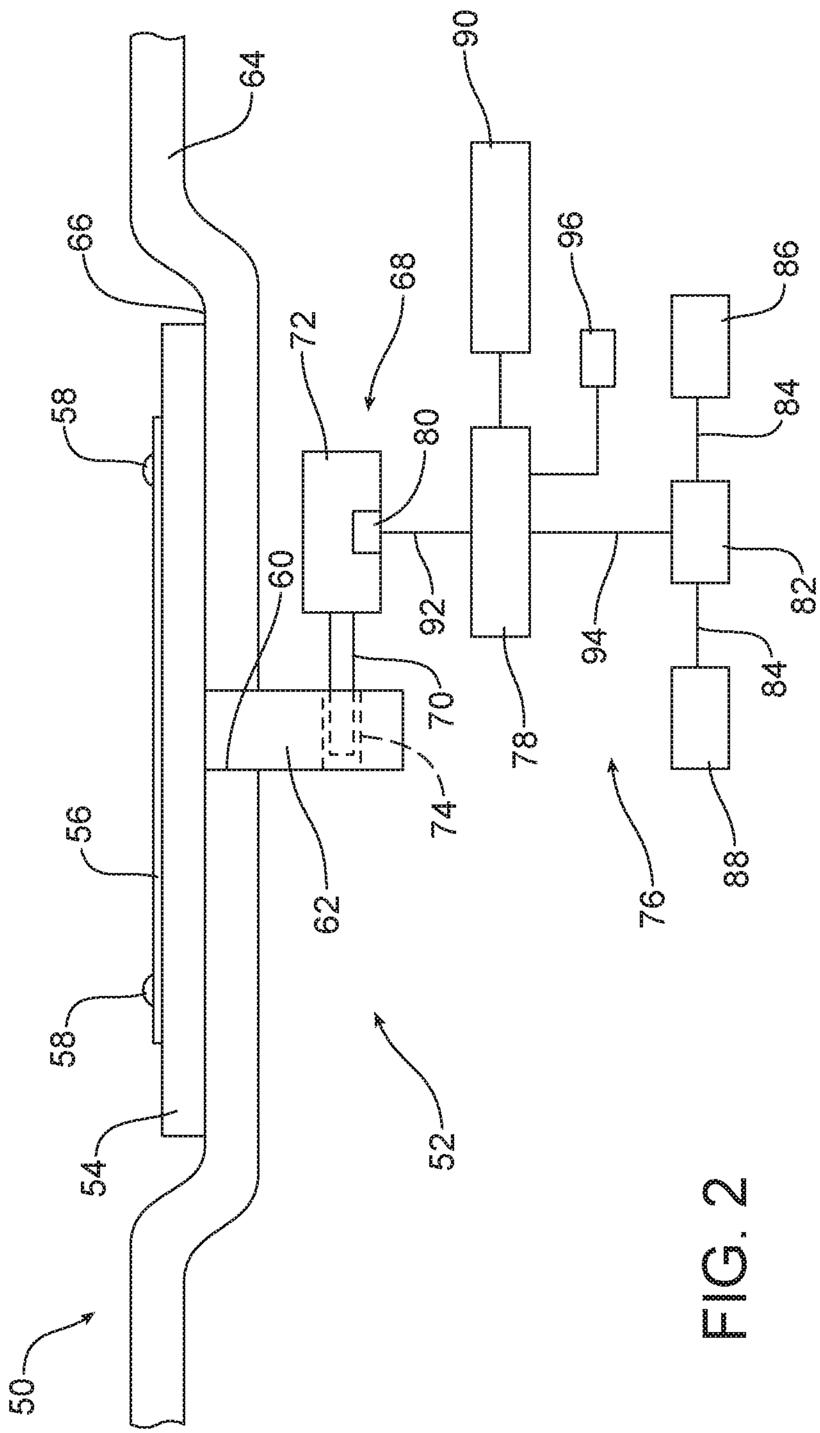
FIG. 2 is a schematic block diagram of a second possible embodiment of the antitheft security system incorporating a lock with an electronic actuator.

Reference is now made to FIG. 2 illustrating another possible embodiment of the antitheft security system 50. The antitheft security system 50 illustrated in FIG. 2 is similar in many respects to the antitheft security system 10 illustrated in FIG. 1. More specifically, the antitheft security system 50 includes a license plate locking mechanism 52 including a license plate mounting bracket 54. The license plate 56 is secured to the mounting bracket 54 by means of screws 58 or other appropriate fasteners.

As further illustrated in FIG. 2, the license plate mounting bracket 54 includes a lug 62 that is inserted through an aperture 60 in a rear body panel 64 of the motor vehicle in order to secure the license plate 56 in a home position such as the recess 66 in the body panel 64. When the license plate mounting bracket 54 is properly seated in the home position/recess 66, a latch 68 secures the license plate mounting bracket 54 and, therefore, the license plate 56 connected thereto, in the home position. In the embodiment illustrated in FIG. 2, the latch 68 comprises a latch bolt 70 and a cooperating electronic latch actuator 72. When locked, the latch bolt 70 is extended from the actuator 72 into a cooperating aligned aperture 74 provided in the lug 62.

The antitheft security system 50 also includes a control module, generally designated by reference numeral 76. The control module 76 includes a controller 78 similar to the controller 34 of the first embodiment of the antitheft security system 10 illustrated in FIG. 1. The controller 78 is connected to a device or sensor 80 for monitoring the status of the latch 68. In addition, the controller 78 is connected to a defeat switch 82 in the power line 84 leading from the power source 86 to a motor 88 of the motor vehicle. As described above, where the motor vehicle is powered by an internal combustion engine, that motor 88 may comprise the starter motor for starting the internal combustion engine. In contrast, where the motor vehicle is powered by an electric traction motor, that motor 88 may be the electric traction motor.

In addition, the control module 76 may include an actuator 90 in the form of a push button, toggle switch, touch-screen button and/or voice actuation device.

When one wishes to secure the motor vehicle from theft following parking of the motor vehicle, one manipulates the actuator 90 causing the controller 78 to send a control signal to the electronic lock actuator 72 causing the actuator to withdraw the latch bolt 70 from the aperture 74 in the lug 62. The operator or user then removes the license plate mounting bracket 54 with the license plate 56 from the home position/recess 66 on the rear body panel 64 of the motor vehicle. The removal of the lug 62 from engagement with the latch bolt 70 of the latch 68 is confirmed by the device or sensor 80 which then sends a data signal over the control line 92 to the controller 78. In response, the controller 78 sends a control signal along the control line 94 to the defeat switch 82 causing the normally closed defeat switch 82 to open. This serves to interrupt power between the power source 86 and the motor 88 thereby disconnecting the motor 88 (e.g. starter motor or traction motor) from the power source and effectively preventing operation of the motor vehicle.

In summary, either embodiment of the antitheft security system 10, 50 illustrated in FIGS. 1 and 2 provides a number of benefits and advantages. The antitheft security systems 10, 50 both allow one to easily remove the license plate 18 or 56 from the motor vehicle in order to discourage theft of the motor vehicle. In the case of the antitheft security system 10, this is done by simply pushing on the license plate 18 or the license plate mounting bracket 16 thereby causing the lug 22 of the bracket to be disconnected from the latch or push-push lock 24. In the case of the antitheft security system 50, this is done by simply manipulating the actuator 90 and thereby causing the latch bolt 70 to be withdrawn from the aperture 74 in the lug 62 thereby allowing the license plate mounting bracket 54 and license plate 56 to be easily removed.

In addition, the antitheft security systems 10, 50 both then automatically interrupt power from the motor vehicle power sources 42, 86 to prevent operation of the motor vehicle. Thus, two levels of antitheft protection are provided in a simple and efficient manner.

When the operator returns to the motor vehicle, the license plate 18 or 56 is again secured in the home position. In the antitheft security system 10, this is done by inserting the lug 22 through the aperture 30 and pushing the license plate 18 in the direction of action arrow A so that the lug is inserted into the latch or push-push lock 24 and secured in position. In the antitheft security system 50 illustrated in FIG. 2, this is done by inserting the lug 62 through the aperture 60 in the body panel 64. When fully seated, the latch bolt 70 is automatically inserted into the locking aperture 74 in the lug 62 so as to secure the license plate 56 in the home position/recess 66.

The device or sensor 36 in the antitheft security system 10 and the device or sensor 80 in the antitheft security system 50 provides a control signal to the respective controller 34, 78 indicating reconnection of the license plate 18, 56 in the home position 26 or 66. The controller 34 or 78 then provides a control signal along the respective lines 48, 94 to the respective defeat switches 38, 82 returning those defeat switches to their normally closed position thereby restoring the power connection between the respective motor vehicle power sources 42, 86 and the respective motors 44, 88 of the motor vehicle. Here it should be appreciated that the controllers 34, 78 may both include a warning indicator 96 reminding the motor vehicle operator to reconnect the license plate if the operator has not already done so prior to attempting to operate the motor vehicle.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An antitheft security system for a motor vehicle, comprising:
- a license plate locking mechanism securing a license plate to the motor vehicle; and
- a control module including a controller configured to interrupt power from a power source of said motor vehicle in response to disconnection of said license plate from said motor vehicle.

2. The antitheft security system of claim 1, wherein said license plate locking mechanism includes a bracket holding said license plate and a latch securing said bracket to said motor vehicle.

3. The antitheft security system of claim 2, wherein said latch is a push-push lock and said bracket includes a lug received and held in said push-push lock.

4. The antitheft security system of claim 3, wherein said control module further includes a device for monitoring receipt of said lug in said push-push lock.

5. The antitheft security system of claim 4, wherein said control module includes a defeat switch between said power source and a starter motor of said motor vehicle whereby when said lug is removed from said push-push lock, said defeat switch is opened to interrupt the power from said power source to said starter motor.

6. The antitheft security system of claim 4, wherein said control module includes a defeat switch between said power source and a traction motor of said motor vehicle whereby when said lug is removed from said push-push lock, said defeat switch is opened to interrupt the power from said power source to said traction motor.

7. The antitheft security system of claim 2, wherein said latch includes an electronic actuator and said bracket includes a lug engaged and held by said latch.

8. The antitheft security system of claim 7, wherein said control module further includes a device for monitoring engagement of said lug with said latch.

9. The antitheft security system of claim 8, wherein said control module includes a defeat switch between said power source and a starter motor of said motor vehicle whereby when said lug is removed from engagement with said latch, said defeat switch is opened to interrupt the power from said power source to said starter motor.

10. The antitheft security system of claim 8, wherein said control module includes a defeat switch between said power source and a traction motor of said motor vehicle whereby when said lug is removed from engagement with said latch, said defeat switch is opened to interrupt the power from said power source to said traction motor.

11. The antitheft security system of claim 10, wherein said control module further includes an actuator to lock and unlock said latch from said lug.

12. A method of securing a motor vehicle against theft, comprising:
- preventing, by a control module, operation of said motor vehicle when a license plate has been removed from a home position on said motor vehicle;
- holding said license plate in a bracket and locking, by a lock, said bracket to said motor vehicle when said license plate is in said home position;
- detecting, by a monitoring device, when said lock is unlocked and said license plate is removed from said home position; and
- interrupting, by said control module, power from a power source when said lock is unlocked and said license plate is removed from said home position.

* * * * *